United States Patent [19]

Voss

[11] Patent Number: 5,267,409

[45] Date of Patent: Dec. 7, 1993

[54] TOWED FISHING TACKLE OR THE LIKE

[76] Inventor: Rainer F. Voss, Nächstenbacher Berg 8, D-6940 Weinheim, Fed. Rep. of Germany

[21] Appl. No.: 696,518

[22] Filed: May 7, 1991

[30] Foreign Application Priority Data

May 9, 1990 [DE] Fed. Rep. of Germany ....... 4014857

[51] Int. Cl.⁵ ............................................. A01K 91/08
[52] U.S. Cl. ..................................................... 43/42.74
[58] Field of Search ............. 43/4.5, 42.74, 43.1, 43/43.13

[56] References Cited

U.S. PATENT DOCUMENTS

| | | | |
|---|---|---|---|
| 1,840,762 | 1/1932 | Akervick | 43/42.74 |
| 2,070,514 | 2/1937 | Marlow | 43/43.1 |
| 3,363,359 | 1/1968 | Oney | 43/42.39 |
| 3,401,483 | 9/1968 | Bellah et al. | 43/43.1 |
| 3,898,758 | 8/1975 | Swanningson | 43/43.13 |
| 3,956,847 | 5/1976 | Bayes | 43/43.1 |
| 4,841,664 | 6/1989 | Baldwin | 43/42.74 |
| 4,858,370 | 8/1989 | Ryder | 43/43.13 |
| 4,862,626 | 9/1989 | Hamaguchi | 43/4.5 |

FOREIGN PATENT DOCUMENTS 90480  6/1958  Norway ............... 43/42.74

Primary Examiner—Paula A. Bradley
Assistant Examiner—Jeanne M. Elpel
Attorney, Agent, or Firm—Renner, Otto, Boisselle & Sklar

[57] ABSTRACT

The towed fishing tackle comprises at least one additional line arranged on its tow line and is provided with a fish-like dummy as well as at least one hook and/or bait, and one line which is provided with a hook and/or bait and is arranged on the fish-like dummy. The yield of the catch is increased considerably as a result of the towed fishing tackle, without this resulting in an increased labour input during the fishing operation.

9 Claims, 1 Drawing Sheet

TOWED FISHING TACKLE OR THE LIKE

BACKGROUND

When sailing, or even motorboat-riding, at sea, it is often customary to use so-called towed fishing tackle as the fishing gear.

In this regard, a tow line with bait attached thereto is pulled along behind the boat, it being possible for the tow line both to form part of conventional fishing gear, such as, for example, a fishing rod, or to be deep-sea fishing tackle, or, on the other hand, to be secured on or to a reel which is, in turn, attached astern to the railing of the boat.

In this regard, the object is to catch fish during the boat trip with the assistance of the hook and/or bait attached to the tow line. The yield in this type of fishing can, however, as a rule, be described as extremely low.

SUMMARY OF THE INVENTION

The invention is based on the object of providing a towed fishing tackle or the like by means of which the yield can be increased substantially, without however increasing the labour input during the angling operation.

As a result of the fact that, according to the invention, at least one additional line is arranged on the tow line, that a fish-like dummy, having at least one line attached thereto, is arranged on the free end of at least one of the lines, that a hook and/or bait is/are attached to the free end of at least one line not having a fish-like dummy, and that a hook and/or bait is/are secured in positioned at the end of that line which is arranged on the fish-like dummy, the impression is created during the angling operation that a first hook or bait is being chased by the fish-like dummy, with the result that, because of this spectacle, the hunting instinct of the fish in the vicinity is aroused, with the result that the bait provided on the towed fishing tackle exudes a far greater lure to be snatched, such that the catch is increased substantially and a five to ten times greater yield can be achieved. Added to this is the fact that, as a result of the design according to the invention, the labour input during the angling operation is not increased and the towed fishing tackle can be used in the conventional manner, without necessitating any additional working steps during the angling operation.

When the distance between the towed fishing tackle and the fish-like dummy, which is arranged at at least one free end of at least one of the lines, is greater than the distance between the towed fishing tackle and the hook and/or bait attached to the free end of at least one line which does not have the fish-like dummy, then the impression that the fish-like dummy is chasing the bait disposed on the other line is intensified considerably, with the result that a particularly strong attraction emanates from the bait provided on the towed fishing tackle.

If a plurality of lines is arranged on the fish-like dummy, this will have the result that the impression is created that the bait or hooks provided on the lines are a school of fish to be captured and this, too, results in an additional lure intensification and, thereby, to an increase in the yield of the catch.

When the lines which are arranged on the fish-like dummy are of different lengths, then a number of attracted fish can attack the bait without any restraint or without being deterred or driven away be each another.

When a fastening device is provided on the towed fishing tackle, it is possible, without any difficulty, to attach additional or one further line to the towed fishing tackle, without requiring any technical skills in this regard.

It is a particularly favourable design of the fastening device when the fabricating device is a loop, since this provides a simple yet reliable fastening means.

As a result of the fact that only one additional line is attached to the toward fishing tackle, there is no danger that a knotting or entangling of numerous lines will occur.

When the additional line is attached to the loop, and when the loop is arranged at a distance from the free end of the tow line, then the means are thereby provided, in a simple yet effective manner, for the free ends, i.e. the free end of the additional line attached to the tow line and the free end of the tow line itself, to be arranged at a distance with respect to one another such that, without difficulty and, therefore, in the simplest manner, the impression is created that that bait which is disposed at the first end, when viewed in the direction towards the towed fishing tackle, is being chased by the fish-like dummy which is disposed at the rear end, when viewed in the direction of the toward fishing tackle.

When the fish-like dummy is arranged on the free end of the additional line, and when a hook and/or bait is secured in position on the free end of the two line, then this embodiment also provides the means for achieving the chasing effect, it being possible, in a simple manner, to exchange the fish-like dummy as desired, such that different dummy forms or colours can be used for a wide range of intended catches.

When two additional lines are attached to the tow line, such that one of the two lines functions as bait line which is to be chased, the other line accommodating the fish-like dummy, then both lines, i.e. both the bait and the fish-like dummy chasing it, can be exchanged or replaced, simply and speedily, in accordance with the catch results desired.

When the two lines are attached to the loop, and when the loop is arranged at the free end of the two line, then this represents the simplest and most effective manner of attaching the lines without involving a substantial expenditure of time during possible replacing.

If the fish-like dummy is arranged on the longer of the two lines, and the hook and/or bait is/are secured to the shorter of the two lines, then this, in turn, also arouses the lure or hunting instinct of the fish encircling the towed fishing tackle, because the impression is created, in a particularly advantageous manner, that the fish-like dummy is chasing the bait or hook which is disposed on the shorter line.

BRIEF DESCRIPTION OF THE DRAWINGS

An exemplified embodiment of the towed fishing tackle according to the invention is diagrammatically illustrated in the drawing, in which.

DETAILED DESCRIPTION

Figure 1:
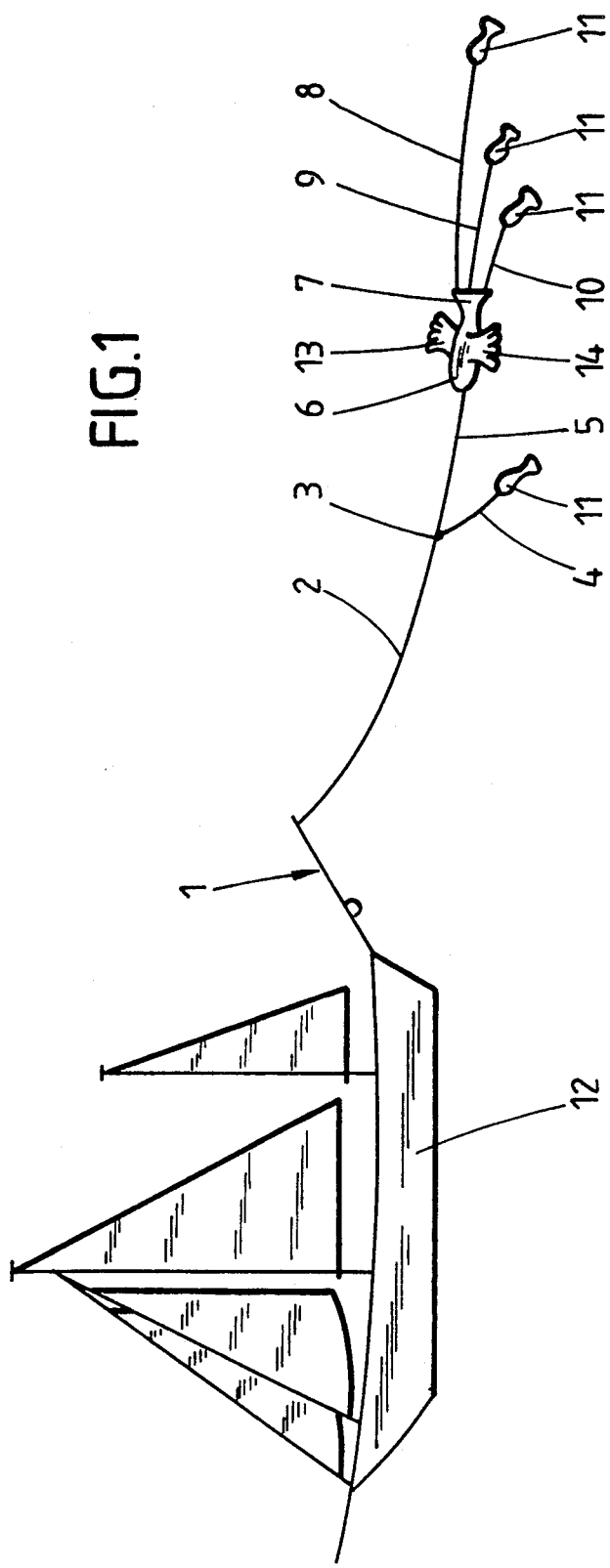
FIG. 1 shows a side view of a towed fishing tackle which is in use.

As illustrated in FIG. 1, the towed fishing tackle is used, for example, during boat trips, the present exemplified embodiment involving a deep-sea toward fishing tackle (1) which is secured to a sailboat. In this regard, the line (2) of the deep-sea towed fishing tackle (1) can be extended to a varying degree and is drawn along by and behind the sailboat.

Figure 2:
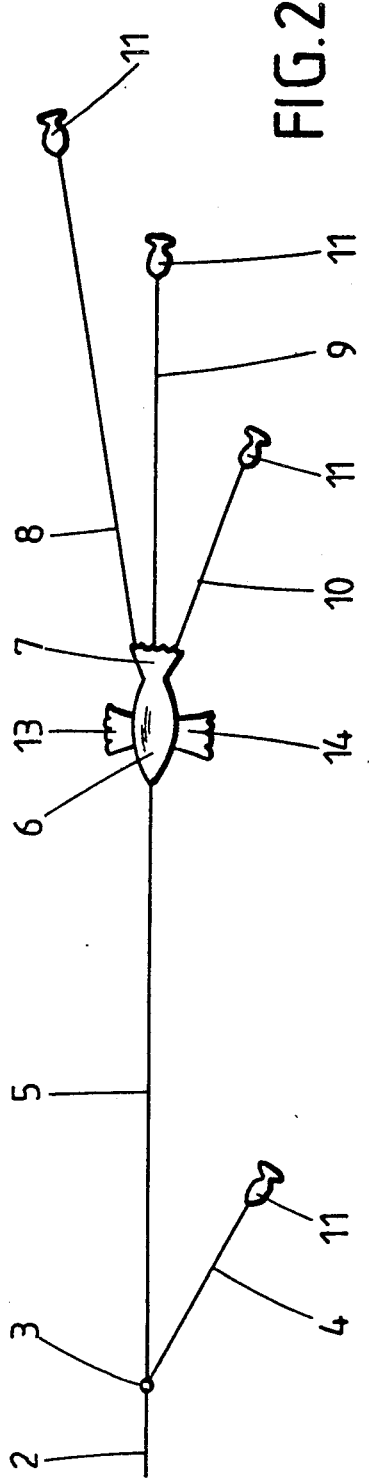
FIG. 2 shows a partial view of the tow line with bait.

As indicated in FIG. 2, a loop (3) is arranged at the end of the toward fishing tackle line (2), to which loop is attached a first, so-called, bait line (4), which may have a variety of lengths, the length in the present Example being approximately 50 cm.

In addition, a second bait line (5) is attached to the loop (3) which is arranged on the toward fishing tackle line (2), said second bait line having, at its end, a fish-like dummy (6) which is firmly connected thereto. In the present exemplified embodiment, said second bait line (5) is approximately 1.50 m long and is composed, as is also the first bait line, for example, of a commercial fishing line. It is, however, also conceivable that the first and second bait lines are firmly connected to one another and have a joint mechanism to secure the loop (3) is position at their common end which faces the loop (3), in the viewing direction in FIG. 2.

In addition, it would also be possible that the fish-like dummy (6) which is connected to the second bait line (5) is merely detachably and, therefore, exchangeably, attached thereto.

The fish-like dummy (6) can be manufactured of various materials, such as, for example, wood or plastics material, and may vary both with regard to shape and colour design.

Through the selection of the material, it is possible to provide the buoyancy characteristics of the fish-like dummy (6) as desired, in the present exemplified embodiment a material having been selected which permits the dummy to drift on the surface of the water.

At the end, i.e. on the tail fin (7) of the fish-like dummy (6), additional bait lines (8, 9, 10) are arranged, being three additional bait lines in the present exemplified embodiment, bait being provided both in the case of the first bait line (4) and in the three additional, according to the present exemplified embodiment, bait lines (8, 9, 10) which are arranged on the tail fin (7), in each case at the end, i.e. at that end which faces away from the loop (3) or from the tail fin (7), which bait is attached to the lines (4, 8, 9, 10) in the usual manner and is connected to the usual books or other catching devices.

When in use, the first bait line (4), together with the bait attached thereto, is latched into the loop (3) which is provided on the line (2) of the toward fishing tackle (1), as is also the second bait line (5), together with the fish-like dummy (6) disposed thereon and the bait lines (8, 9, 10) which are attached to the tail fin (7) of said fish-like dummy (6) and are provided with bait.

The towed fishing tackle line (2) is then reeled off the fishing reel of the deep-sea towed fishing tackle (1), such that the towed fishing tackle line (2) and the bait lines (4; 8, 9, 10) which are attached thereto by means of the loop (3) are towed behind the ship (12) or boat as it travels.

As a result of the fact that the first bait line (4) has bait (11) at its end and this line (4) is designed to be shorter than the second baid line (5), with the fish-like dummy provided thereon, the impression is created, in the case of towed fishing tackle toward along behind a moving ship (12), that the fish-like dummy (6) is chasing the bait (11) suspended on the first bait line (4). Predatory fish in the vicinity, or fish which are in the vicinity and are interested in bait of this kind, are incited, or their inclination to hunt is aroused such that they also carry out an attempt to chase or to catch the bait (11).

The attraction emanating from the bait (11) is considerably increased by the design of the towed fishing tackle (1) according to the invention and the yield of the catch is increased, it having been found that fish take both the bait (11) from the bait lines (8, 9, 10) attached to the dummy (6) as well as the bait (11) from the bait line (4) which is connected directly to the loop (3).

The bait (11) provided at the ends of the bait lines (4, ,8, 9 and 10) can be natural bait such, as small fish, or can also be artificial bait, such as illuminated bait. In all cases, the bait is allocated a fish-hook, which is not illustrated in the drawing and is adapted to the size of the fish to be caught.

The bait lines (8, 9 and 10) which are attached to the tail fin (7) of the fish-like dummy (6) are of different lengths, such that the bait (11) arranged at their free ends is, so to say, towed one behind the other, when the ship (12) is moving. Preferably, the bait lines (8, 9 and 10) are detachably and, therefore, exchangeably attached to the tail fin (7) of the fish-like dummy (6).

The fish-like dummy (6) is provided with two laterally arranged, so to speak wing-like fins (13) and (14), which serve to stabilize the towed dummy (6) in the water. These fins (13) and (14) are disposed approximately in the same plane as the tail fin (7) which is designed to be flat and thus, like the fins (13) and (14), serves to contribute to the stabilization of the fish-like dummy (6) which is, expediently, towed just below the surface of the water.

The towed fishing tackle (1) described above, together with all its parts, forms an entity which can be supplied as a set. Only when natural bait (11) is desired, this must be obtained locally.

What is claimed is:

1. Towed fishing tackle comprising a first line having a leading end and a trailing end, a fish shaped body on the trailing end of the first, at least one bait line attached to the first line forward of the fish shaped body, and at least another bait line attached to the fish shaped body, the fish shaped body having a nose end and a tail end, the trailing end of the first line being attached to the nose end of the fish shaped body, and said at least one bait line having a length less than the length of the first line between the fish shaped body and the point of attachment of said at least one bait line to the first line.

2. Towed fishing tackle as set forth in claim 1, wherein said at least another bait line includes first and second bait lines attached to said fish shaped body.

3. Toward fishing tackle as set forth in claim 2, wherein said first and second bait lines are of different lengths.

4. Towed fishing tackle as set forth in claim 1, wherein said at least another bait line includes first, second and third bait lines attached to said fish shaped body.

5. Towed fishing tackle as set forth in claim 4, wherein said first, second and third bait lines are of different lengths.

6. Towed fishing tackle as set forth in claim 1, wherein a fastening device is provided on the first line.

7. Towed fishing tackle as set forth in claim 6, wherein said fastening device is a loop.

8. Towed fishing tackle as set forth in claim 1, wherein said fish shaped body has lateral fins.

9. Towed fishing tackle as set forth in claim 8, wherein said fish shaped body has a flat tail fin.

* * * * *